(12) United States Patent
Kuboyama et al.

(10) Patent No.: US 12,390,793 B2
(45) Date of Patent: Aug. 19, 2025

(54) POROUS COMPOSITE AND METHOD OF PRODUCING POROUS COMPOSITE

(71) Applicant: NGK Insulators, Ltd., Nagoya (JP)

(72) Inventors: Masashi Kuboyama, Yoro (JP); Kenichi Hidaka, Nagoya (JP); Takuya Nakashima, Nagoya (JP); Yunie Izumi, Nisshin (JP)

(73) Assignee: NGK INSULATORS, LTD., Nagoya (JP)

( * ) Notice: Subject to any disclaimer, the term of this patent is extended or adjusted under 35 U.S.C. 154(b) by 481 days.

(21) Appl. No.: 17/805,497

(22) Filed: Jun. 6, 2022

(65) Prior Publication Data

US 2022/0297092 A1    Sep. 22, 2022

Related U.S. Application Data

(63) Continuation of application No. PCT/JP2021/003240, filed on Jan. 29, 2021.

(30) Foreign Application Priority Data

Feb. 4, 2020 (JP) .................................. 2020-017004

(51) Int. Cl.
*B01J 23/10*  (2006.01)
*B01D 46/24*  (2006.01)
(Continued)

(52) U.S. Cl.
CPC .......... *B01J 23/34* (2013.01); *B01D 46/2418* (2013.01); *B01D 53/94* (2013.01); *B01J 23/10* (2013.01);
(Continued)

(58) Field of Classification Search
CPC ... B01J 23/10; B01J 23/34; B01J 35/19; B01J 35/50; B01J 35/56; B01D 46/2418; F01N 3/0222
(Continued)

(56) References Cited

U.S. PATENT DOCUMENTS 5,334,570 A * 8/1994 Beauseigneur ........ B01J 37/024
502/262
7,348,289 B2 * 3/2008 Ichikawa ............... B01D 53/94
502/247

(Continued)

FOREIGN PATENT DOCUMENTS

| CN | 110292934 A | 10/2019 |
| CN | 110314711 A | 10/2019 |

(Continued)

OTHER PUBLICATIONS

English translation of the International Preliminary Report on Patentability (Chapter I) dated Aug. 18, 2022 (Application No. PCT/JP2021/003240).

(Continued)

*Primary Examiner* — Cam N. Nguyen
(74) *Attorney, Agent, or Firm* — BURR PATENT LAW, PLLC (57) ABSTRACT

A porous composite includes a porous base material, and a porous collection layer provided on a collection surface of the base material (e.g., on inner surfaces of first cells). The collection layer contains catalyst particles of rare-earth oxide or transition-metal oxide situated in pores of the collection surface of the base material. The collection surface has a covered region that is covered with the collection layer and whose total area is 60% or less of the total area of the collection surface.

10 Claims, 4 Drawing Sheets

(51) Int. Cl.
- *B01D 53/94* (2006.01)
- *B01J 23/34* (2006.01)
- *B01J 35/00* (2006.01)
- *B01J 35/50* (2024.01)
- *B01J 35/56* (2024.01)
- *B01J 37/00* (2006.01)
- *B01J 37/02* (2006.01)
- *F01N 3/02* (2006.01)
- *F01N 3/022* (2006.01)

(52) U.S. Cl.
CPC ............... *B01J 35/19* (2024.01); *B01J 35/50* (2024.01); *B01J 35/56* (2024.01); *B01J 37/0072* (2013.01); *B01J 37/0217* (2013.01); *F01N 3/0222* (2013.01); *B01D 2255/2063* (2013.01); *B01D 2255/2065* (2013.01); *B01D 2255/2066* (2013.01); *B01D 2255/2073* (2013.01); *B01D 2255/9155* (2013.01); *B01D 2255/9202* (2013.01); *B01D 2279/30* (2013.01); *F01N 2330/06* (2013.01)

(58) Field of Classification Search
USPC .................................. 502/300, 302–304, 324
See application file for complete search history.

(56) References Cited

U.S. PATENT DOCUMENTS

| | | | | |
|---|---|---|---|---|
| 8,133,841 B2* | 3/2012 | Noda | ............... | B01D 46/24492 |
| | | | | 422/177 |
| 8,623,488 B2* | 1/2014 | Yamaguchi | ........ | B01D 46/2484 |
| | | | | 428/116 |
| 8,796,172 B2* | 8/2014 | Chinzei | ............... | B01D 53/945 |
| | | | | 502/262 |
| 9,561,476 B2* | 2/2017 | Lane | ....................... | B01J 29/10 |
| 10,112,181 B2* | 10/2018 | Katoh | ..................... | B01J 35/60 |
| 10,668,459 B2* | 6/2020 | Hirano | ................. | B01J 37/0215 |
| 11,428,138 B2* | 8/2022 | Izumi | .................. | C04B 38/0006 |
| 2009/0209416 A1* | 8/2009 | Sato | ........................ | B01J 23/63 |
| | | | | 977/773 |
| 2010/0212831 A1* | 8/2010 | Wang | .................. | H01L 21/6708 |
| | | | | 156/345.18 |
| 2011/0212831 A1 | 9/2011 | Goto et al. | | |
| 2014/0141225 A1* | 5/2014 | Petigny | ............... | C01B 13/0251 |
| | | | | 428/220 |
| 2014/0178262 A1* | 6/2014 | Tran | ........................ | B01J 35/56 |
| | | | | 502/340 |
| 2015/0121824 A1 | 5/2015 | Jinbo et al. | | |
| 2017/0296969 A1 | 10/2017 | Ohashi et al. | | |
| 2019/0291050 A1 | 9/2019 | Izumi | | |
| 2019/0301326 A1 | 10/2019 | Yoshioka et al. | | |
| 2020/0276567 A1 | 9/2020 | Onoe et al. | | |
| 2022/0325645 A1 | 10/2022 | Gensch et al. | | |
| 2024/0116008 A1* | 4/2024 | Nakashima | .............. | B01J 35/51 |

FOREIGN PATENT DOCUMENTS

| | | |
|---|---|---|
| DE | 10 2018 127 953 A1 | 5/2020 |
| EP | 2 441 510 A1 | 4/2012 |
| JP | 2010-094628 A | 4/2010 |
| JP | 2011-147931 A | 8/2011 |
| JP | 5436060 B2 | 3/2014 |
| JP | 5863950 B2 | 2/2016 |
| WO | 2016/056573 A1 | 4/2016 |

OTHER PUBLICATIONS

Xin Liu, et al., "Using Artificial Ash to Improve GPF Performance at Zero Mileage," Ford Motor Company, WCX—World Congress Experience, Apr. 9 to 11, 2019, Paper # 2019-01-0974 (18 pages).
International Search Report and Written Opinion (Application No. PCT/JP2021/003240) dated Apr. 6, 2021 (with English translation).
Chinese Office Action (Application No. 202180005835.4) dated Mar. 30, 2023.
German Office Action (with English translation) dated Mar. 26, 2024 (Application No. 11 2021 000 845.5).

* cited by examiner

POROUS COMPOSITE AND METHOD OF PRODUCING POROUS COMPOSITE

CROSS-REFERENCE TO RELATED APPLICATION

The present application is a continuation application of International Application No. PCT/JP2021/003240 filed on Jan. 29, 2021, which claims the benefit of priority to Japanese Patent Application No. 2020-017004 filed on Feb. 4, 2020. The entire contents of these applications are incorporated herein by reference.

TECHNICAL FIELD

The present invention relates to a porous composite.

BACKGROUND ART

Vehicles or other equipment that mount a diesel engine or a gasoline engine are equipped with a filter for collecting particulate matter in an exhaust gas. The filter removes particulate matter by combustion in order to prevent an increase in pressure loss caused by deposition of the particulate matter.

The publication of Japanese Patent No. 5436060 (Document 1) proposes a technique for suppressing melting of a porous filter base material by causing the filter base material to support an oxidation catalyst on the surface so as to lower the combustion starting temperature of particulate matter. The oxidation catalyst is $Y_{(1-x)}Ag_xMn_{(1-y)}Fe_yO_3$ ($0.01 \leq x \leq 0.30$ and $0.005 \leq y \leq 0.30$).

The publication of Japanese Patent No. 5863950 (Document 2) proposes a honeycomb filter in which a filter layer (collection layer) is formed on the entire wall surfaces of cells of a porous ceramic honeycomb base material. The filter layer has a three-dimensional network structure and is composed of a plurality of globular ceramic particles with a mean particle size of 0.2 μm to 1.2 μm and a bridging material that forms cross-links between the globular ceramic particles. The globular ceramic particles are particles of alumina, silica, mullite, ceria, zirconia, cordierite, zeolite, or titania. The filter layer is formed by a firing process performed at temperatures of 1100° C. to 1500° C. The honeycomb filter in which the filter layer has a three-dimensional network structure having pores facilitates suppressing pressure loss in the honeycomb filter by passing gas constituents in an exhaust gas through the pores of the filter layer.

Xin Liu, et. al. (Ford Motor Company), "Using Artificial Ash to Improve GPF Performance at Zero Mileage," WCX-World Congress Experience, Apr. 9 to 11, 2019, Paper #2019-01-0974 (Document 3) proposes a technique for forming a collection layer by bonding $Al_2O_3$ fine particles similar to soot to the surface of a base material for the purpose of improving collection efficiency of a gasoline particulate filter. The collection layer is formed by spraying a raw material into a furnace and passing the raw material through a filter base material.

According to the filter described in Document 1, since the surface of the filter base material is uniformly covered with the oxidation catalyst, for example as shown in FIGS. 2(a) and 2(b) and described in paragraph [0053], large pressure loss occurs in the filter and fuel consumption of the vehicle may become deteriorated. In Document 2, the three-dimensional network structure of the filter layer suppresses pressure loss, but there is a limit to suppressing pressure loss because the filter layer is provided on the entire wall surfaces of the cells. In Document 3 as well, large pressure loss may occur in the filter due to the presence of the collection layer on the entire surface of the filter base material (see page. 6).

SUMMARY OF INVENTION

The present invention is intended for a porous composite, and it is an object of the present invention to achieve excellent efficiency of collecting particulate matter while suppressing an increase in pressure loss.

A porous composite according to a preferable embodiment of the present invention includes a porous base material, and a porous collection layer provided on a collection surface of the base material. The collection layer contains catalyst particles of rare-earth oxide or transition-metal oxide situated in pores of the collection surface of the base material. The collection surface has a covered region that is covered with the collection layer and whose total area is 60% or less of a total area of the collection surface.

Accordingly, it is possible to achieve excellent efficiency of collecting particulate matter while suppressing an increase in pressure loss.

Preferably, the catalyst particles are made of $CeO_2$, lanthanum-manganese-cerium oxide, or lanthanum-praseodymium-cerium oxide.

Preferably, the catalyst particles have a maximum particle size less than or equal to 10 μm, and the catalyst particles have a median diameter less than 1.0 μm.

Preferably, a total area of the covered region situated in a region other than the pores of the collection surface is 30% or less of the total area of the collection surface.

Preferably, the collection layer in the pores of the collection surface of the base material has a porosity higher than or equal to 20% and lower than or equal to 80%.

Preferably, the base material has a honeycomb structure whose interior is partitioned into a plurality of cells by a partition wall, and at least some of the plurality of cells have inner surfaces serving as the collection surface.

Preferably, the porous composite described above is a gasoline particulate filter that collects particulate matter in an exhaust gas emitted from a gasoline engine.

Preferably, the plurality of cells include a first cell being open at an end of a first side in a longitudinal direction and being sealed at an end of a second side in the longitudinal direction, and a second cell being sealed at an end of the first side in the longitudinal direction and being open at an end of the second side in the longitudinal direction. The first cell has an inner surface that serves as the collection surface on which the collection layer is provided. The second cell has an inner surface on which the collection layer is not provided.

A method of producing a porous composite according to a preferable embodiment of the present invention includes a) atomizing a raw material containing a rare-earth element or a transition-metal element into raw mist, b) generating catalyst particles of rare-earth oxide or transition-metal oxide by heating the raw mist, and c) forming a porous collection layer by adding the catalyst particles together with a carrier gas to a porous base material so as to deposit the catalyst particles in pores of a collection surface of the base material. In the operation b), a temperature of heating the raw mist is lower than 1000° C. The collection surface after the operation c) has a covered region that is covered with the collection layer and whose total area is 60% or less of a total area of the collection surface.

Accordingly, it is possible to achieve excellent efficiency of collecting particulate matter while suppressing an increase in pressure loss.

Preferably, in the operation c), the catalyst particles are added to the base material for a period of time longer than or equal to 0.5 minutes and shorter than or equal to 60 minutes.

Preferably, the method of producing a porous composite described above does not include heating the base material to increase a strength to fix the catalyst particles to the base material after the operation c).

These and other objects, features, aspects and advantages of the present invention will become more apparent from the following detailed description of the present invention when taken in conjunction with the accompanying drawings.

BRIEF DESCRIPTION OF DRAWINGS

FIG. 6 shows an SEM image of the porous composite according to Example 2; and.

DESCRIPTION OF EMBODIMENTS

Figure 1:
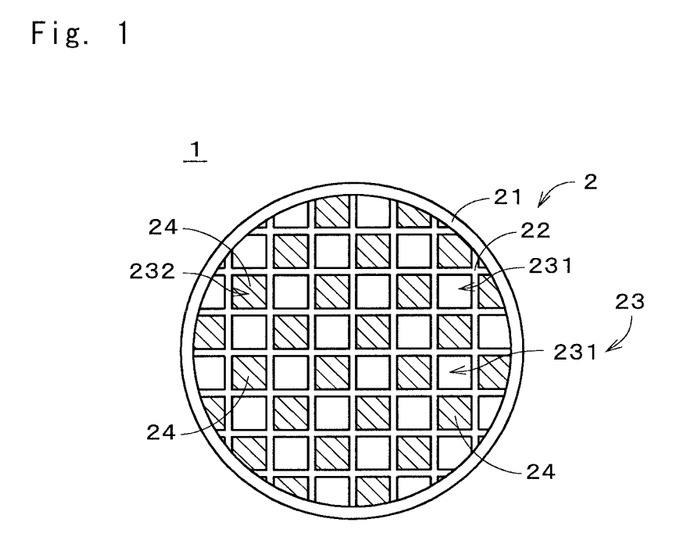
FIG. 1 is a plan view of a porous composite according to one embodiment.
Figure 2:
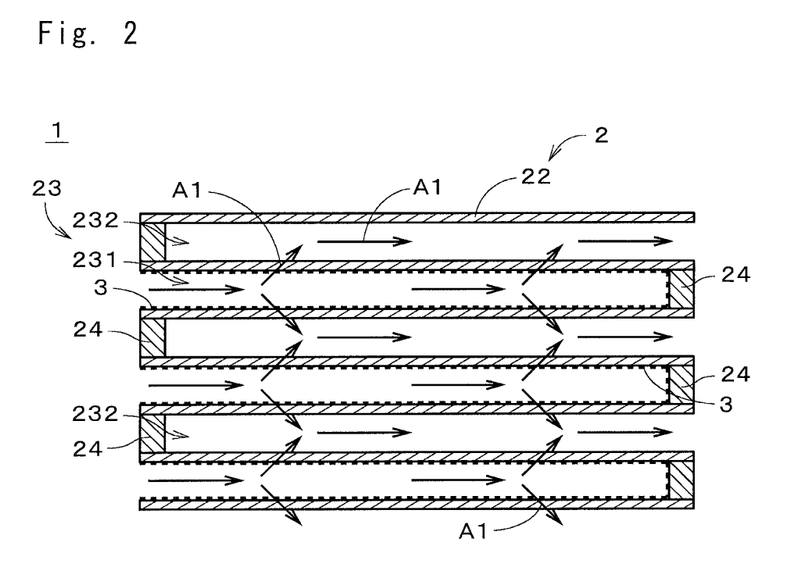
FIG. 2 is a sectional view of the porous composite.

FIG. 1 is a plan view illustrating a porous composite 1 according to one embodiment of the present invention in simplified form. The porous composite 1 is a tubular member that is long in one direction. In FIG. 1, the end face of the porous composite 1 on one side in the longitudinal direction is illustrated. FIG. 2 is a sectional view of the porous composite 1. In FIG. 2, part of a section along the longitudinal direction is illustrated. For example, the porous composite 1 may be used as a gasoline particulate filter (GPF) that collects particulate matter such as soot in an exhaust gas emitted from a gasoline engine of equipment such as an automobile.

The porous composite 1 includes a porous base material 2 and a porous collection layer 3. In the example illustrated in FIGS. 1 and 2, the base material 2 is a member that has a honeycomb structure. The base material 2 includes a tubular outer wall 21 and a partition wall 22. The tubular outer wall 21 is a tubular portion that extends in the longitudinal direction (i.e., in the right-left direction in FIG. 2). For example, the tubular outer wall 21 has a generally circular sectional shape perpendicular to the longitudinal direction. This sectional shape may be any other shape such as a polygonal shape.

The partition wall 22 is a grid-shaped portion that is provided inside the tubular outer wall 21 and that partitions the interior of the tubular outer wall into a plurality of cells 23. The cells 23 each form a space that extends in the longitudinal direction. Each cell 31 has, for example, a generally square sectional shape perpendicular to the longitudinal direction. This sectional shape may be any other shape such as a polygonal shape or a circular shape. As a general rule, the cells 23 have the same sectional shape. Alternatively, the cells 23 may include cells 23 that have different sectional shapes. The base material 2 is a cell structure whose interior is partitioned into the cells 23 by the partition wall 22.

The tubular outer wall 21 and the partition wall 22 are both porous. The tubular outer wall 21 and the partition wall 22 are formed of ceramic such as cordierite. The materials for the tubular outer wall 21 and the partition wall 22 may be ceramic other than cordierite, or may be materials other than ceramic.

The tubular outer wall 21 has a longitudinal length of, for example, 50 mm to 300 mm. The tubular outer wall 21 may have an outside diameter of, for example, 50 mm to 300 mm. The thickness of the tubular outer wall 21 may, for example, be greater than or equal to 30 μm (micrometers) and preferably greater than or equal to 50 μm. The thickness of the tubular outer wall 21 may also, for example, be less than or equal to 1000 μm, preferably less than or equal to 500 μm, and more preferably less than or equal to 350 μm.

The longitudinal length of the partition wall 22 is approximately the same as the longitudinal length of the tubular outer wall 21. The thickness of the partition wall 22 may, for example, be greater than or equal to 30 μm and preferably greater than or equal to 50 μm. The thickness of the partition wall 22 may also, for example, be less than or equal to 1000 μm, preferably less than or equal to 500 μm, and more preferably less than or equal to 350 μm. The porosity of the partition wall 22 may, for example, be higher than or equal to 20% and preferably higher than or equal to 30%. The porosity of the partition wall 22 may also, for example, be lower than or equal to 80% and preferably lower than or equal to 70%. The open porosity of the partition wall 22 may, for example, be higher than or equal to 40% and preferably higher than or equal to 55%. The open porosity of the partition wall 22 may also, for example, be lower than or equal to 65%. The porosity and the open porosity of the partition wall 22 can be measured by the Archimedes method.

For example, the partition wall 22 may have a mean pore size greater than or equal to 5 μm and preferably greater than or equal to 8 μm. The mean pore size of the partition wall 22 may also, for example, be less than or equal to 30 μm and preferably less than or equal to 25 μm. The mean pore size can be measured with a mercury porosimeter. The surface open area ratio of the partition wall 22 may, for example, be larger than or equal to 20% and preferably larger than or equal to 30%. The surface open area ratio of the partition wall 22 may also, for example, be smaller than or equal to 80% and preferably smaller than or equal to 60%. The surface open area ratio can be obtained by analyzing a scanning electron microscope (SEM) image of the surface of the partition wall 22. This image analysis is conducted using image analysis software "Image-Pro version 9.3.2" manufactured by Nippon Roper K. K.

A cell density of the base material 2 (i.e., the number of cells 23 per unit area of a section perpendicular to the longitudinal direction) may, for example, be higher than or equal to 10 cells per square centimeter (cells/cm$^2$), preferably higher than or equal to 20 cells/cm$^2$, and more preferably higher than or equal to 30 cells/cm$^2$. The cell density may also, for example, be lower than or equal to 200 cells/cm$^2$ and preferably lower than or equal to 150 cells/cm$^2$. In the illustration in FIG. 1, the sizes of the cells 23 are larger than the actual sizes, and the number of cells 23 is smaller than the actual number. The sizes, number, and any other information of the cells 23 may be modified in various ways.

In the case where the porous composite 1 is used as a GPF, a gas such as an exhaust gas flows through the inside of the porous composite 1, with one end side of the porous composite 1 in the longitudinal direction (i.e., the left side in FIG. 2) as an inlet and the other end side thereof as an outlet. Some of the cells 23 of the porous composite 1 have a mesh sealing part 24 at the end on the inlet side, and the remaining cells 23 have a mesh sealing part 24 at the end on the outlet side.

FIG. 1 is an illustration of the inlet side of the porous composite 1. In FIG. 1, the mesh sealing parts 24 on the inlet side are cross-hatched in order to facilitate understanding of the drawing. In the example illustrated in FIG. 1, the cells 23 that have the mesh sealing part 24 on the inlet side and the cells 23 that do not have the mesh sealing part 24 on the inlet side (i.e., the cells 23 that have the mesh sealing part 24 on the outlet side) are arranged alternatively in both the vertical and lateral directions in FIG. 1.

In the following description, the cells 23 that have the mesh sealing part 24 on the outlet side are also referred to as "first cells 231," and the cells 23 that have the mesh sealing part 24 on the inlet side are also referred to as "second cells 232." In the case where there is no need to distinguish between the first cells 231 and the second cells 232, the cells 23 are collectively referred to as "cells 23" as described previously. The cells 23 of the porous composite 1 include a plurality of first cells 231 whose ends of one side in the longitudinal direction are sealed, and a plurality of second cells 232 whose ends of the other side in the longitudinal direction are sealed, the first cells 23 and the second cells 23 being arranged alternately.

The collection layer 3 is formed on the surface of the base material 2. In the example illustrated in FIG. 2, the collection layer 3 is provided in the first cells 231 that have the mesh sealing part 24 on the outlet side, and covers the inner surfaces of the first cells 231 (i.e., the surface of the partition wall 22). The collection layer 3 does not cover the entire inner surfaces of the first cells 231 and covers part of the inner surfaces. In FIG. 2, the collection layer 3 is indicated by bold broken lines. The collection layer 3 also covers the inner surfaces of the mesh sealing parts 24 on the outlet side in the first cells 231. On the other hand, the collection layer 3 does not exist in the second cells 232 that have the mesh sealing part 24 on the inlet side. In other words, the inner surfaces of the second cells 232 are exposed without being covered with the collection layer 3.

The collection layer 3 contains catalyst particles of rare-earth oxide or transition-metal oxide. Rare-earth elements composing the rare-earth oxide include scandium (Sc), yttrium (Y), and lanthanoids. Lanthanoids include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). The collection layer 3 contains an oxide of one or more types of rare-earth elements and/or an oxide of one or more types of transition-metal elements as the catalyst particles. The collection layer 3 may also contain substances other than the catalyst particles, but it is preferable that the collection layer 3 is substantially composed of only the catalyst particles.

The catalyst particles are preferably made of $CeO_2$, lanthanum-manganese-cerium oxide, or lanthanum-praseodymium-cerium oxide. In other words, the catalyst particles contains one or more types of $CeO_2$, lanthanum-manganese-cerium oxide, and lanthanum-praseodymium-cerium oxide. The lanthanum-manganese-cerium oxide is an oxide that contains La, Mn, and Ce and hereinafter also referred to as "La—Mn—Ce—O." The lanthanum-praseodymium-cerium oxide is an oxide that contains La, Pr, and Ce and hereinafter also referred to as "La—Pr—Ce—O."

The median diameter of the catalyst particles, which serve as an aggregate composing the collection layer 3, may preferably be less than 1.0 μm and more preferably less than or equal to 0.8 μm. There are no particular limitations on the lower limit for the median diameter of the catalyst particles, and the median diameter may preferably be as smaller as possible. The catalyst particles in the collection layer 3 may preferably have a maximum particle size less than or equal to 10 μm and more preferably less than or equal to 5 μm. The specific surface area of the catalyst particles in the collection layer 3 may preferably be larger than or equal to 1 $m^2/g$ and more preferably larger than or equal to 20 $m^2/g$. There are no particular limitations on the upper limit for the specific surface area of the catalyst particles, and the specific surface area may preferably be as large as possible. The median diameter and the maximum particle size of the catalyst particles can be measured by laser diffractometry. The specific surface area of the catalyst particles can be measured by the BET specific surface area method.

As described above, the collection layer 3 covers only part of the inner surfaces of the first cells 231. The total area of a region of the inner surfaces of the first cells 231 that is covered with the collection layer 3 is 60% or less of the total area of the inner surfaces of the first cells 231. In the following description, the inner surfaces of the first cells 231 of the base material on which the collection layer 3 is provided are also referred to as "collection surfaces." The region of the collection surface that is covered with the collection layer 3 is also referred to as a "covered region." In the case where the collection layer 3 has pores and the base material 2 is exposed through the pores, regions in which the base material 2 is exposed through the pores are not included in the covered region. It is preferable that the total area of the covered region is 60% or less of the total area of the collection surface. The total area of the covered region may also preferably be 10% or more of the total area of the collection surface and more preferably 15% or more thereof. In the following description, the rate of the total area of the covered region to the total area of the collection surface is also referred to as a "covered ratio."

It is preferable in the porous composite 1 that many of the aforementioned catalyst particles of the collection layer 3 are situated inside pores (i.e., openings of open pores) of the inner surfaces of the first cells 231 (i.e., the collection surface of the base material 2). In other words, the covered region that is situated in a region of the collection surface of the base material 2 other than the openings of the open pores (hereinafter, also referred to as an "outside-pore region") is preferably small. Specifically, the total area of the covered region in the outside-pore region of the collection surface may preferably be 30% or less of the total area of the collection surface and more preferably 10% or less thereof. In the following description, the rate of the total area of the covered region situated in the outside-pore region to the total area of the collection surface is also referred to as an "outside-pore covered ratio."

It is preferable that the porosity of the collection layer 3 in the pores of the collection surface is higher than or equal to 20%, more preferably higher than or equal to 35%, and yet more preferably higher than or equal to 50%. It is also preferable that the porosity is lower than or equal to 80% and more preferably lower than or equal to 70%. The porosity of the collection layer 3 in the pores of the collection surface can be obtained by analyzing an SEM image of the surface of the porous composite 1, using the aforementioned image analysis software.

In the porous composite 1 illustrated in FIGS. 1 and 2, as indicated by arrows A1 in FIG. 2, the gas flowing into the porous composite 1 flows into the first cells 231 from the inlets of the first cells 231 whose inlet sides are not sealed, and flows from the first cells 231 through the collection layer 3 and the partition wall 22 into the second cells 232 whose outlet sides are not sealed. At this time, particulate matter in the gas is efficiently collected in the collection layer 3. The aforementioned catalyst particles contained in the collection layer 3 accelerate combustion (i.e., removal by oxidation) of the collected particulate matter.

Figure 3:
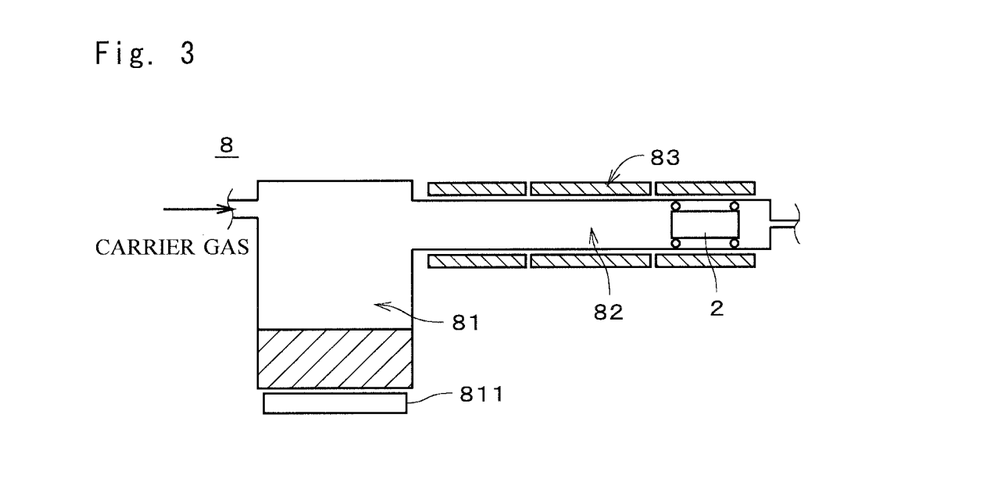
FIG. 3 is an illustration of a production unit that produces the porous composite.
Figure 4:
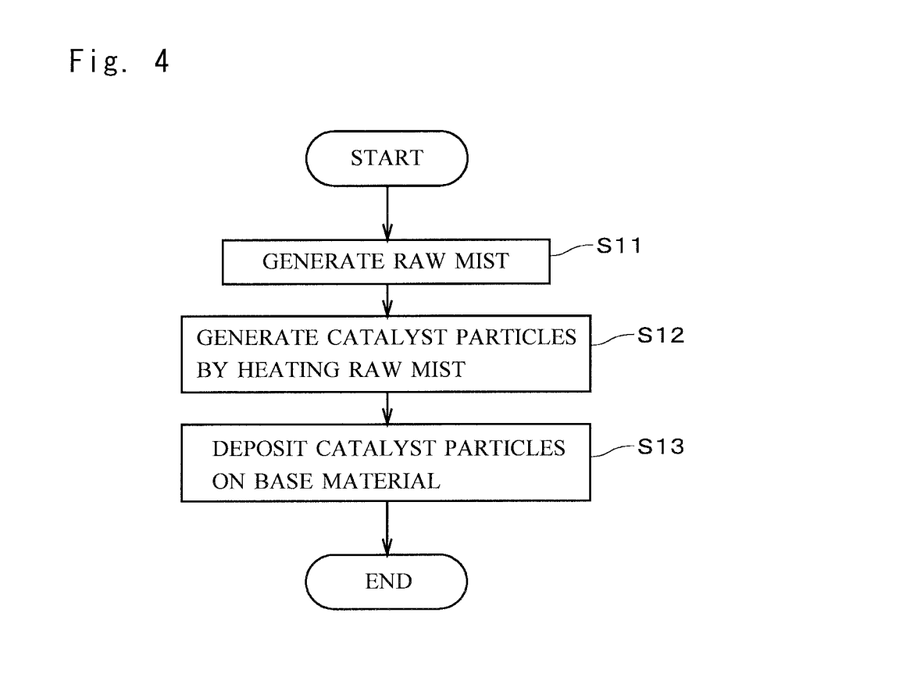
FIG. 4 is a flowchart of production of the porous composite.

Next, one example of the method of producing the porous composite 1 will be described with reference to FIGS. 3 and 4. A production unit 8 illustrated in FIG. 3 includes an atomizer chamber 81, a heating chamber 82, and a tube furnace 83. The atomizer chamber 81 has an internal space in which a starting material solution of the collection layer 3 is atomized into mist. The heating chamber 82 may, for example, be generally cylindrical and is connected to the atomizer chamber 81. The internal space of the atomizer chamber 81 and the internal space of the heating chamber 82 communicate with each other. The tube furnace 83 is arranged around the heating chamber 82 to heat the internal space of the heating chamber 82. The internal space of the heating chamber 82 houses the base material 2. The base material 2 is arranged at a position away from the atomizer chamber 81 in the heating chamber 82. The base material 2 is arranged such that the openings of the first cells 231 illustrated in FIG. 2 (i.e., the ends on the side opposite the mesh sealing parts 24) face the atomizer chamber 81. The space between the inner surface of the heating chamber 82 and the both ends of the base material 2 in the longitudinal direction is sealed air-tight with, for example, O rings.

The production unit 8 produces the porous composite 1 by a spray thermal decomposition method. In the production of the porous composite 1, first, ultrasonic waves are applied by an ultrasonic vibrator 811 to a starting material solution stored in the atomizer chamber 81. Accordingly, the starting material solution in the atomizer chamber 81 is atomized into raw mist (i.e., a mist starting material solution) (step S11). The starting material solution contains rare-earth elements or transition-metal elements that serve as a raw material for the aforementioned catalyst particles. For example, the starting material solution may be an aqueous solution of the salt of the rare-earth elements or transition-metal elements. Alternatively, in the atomizer chamber 81, the starting material solution may be atomized into mist by being sprayed from nozzles of an atomizing spray or other equipment.

The raw mist generated in step S11 is conveyed to the heating chamber 82 with a carrier gas (e.g., air) supplied to the atomizer chamber 81. The raw mist is heated by the tube furnace 83 while flowing from the atomizer chamber 81 through the internal space of the heating chamber 82 toward the base material 2. Accordingly, the rare-earth elements or transition-metal elements contained in the raw mist are oxidized into superfine powder of catalyst particles of rare-earth oxide or transition-metal oxide (step S12). In other words, the catalyst particles are synthesized by heating the raw mist.

It is preferable that the temperature of heating the raw mist in the heating chamber 82 is higher than or equal to 100° C. and more preferably higher than or equal to 400° C. It is also preferable that the heating temperature is lower than 1000° C. and more preferably lower than or equal to 800° C. In the case where a different temperature is set for each area in the longitudinal direction of the tube furnace 83, the heating temperature is a maximum temperature of the tube furnace 83. In the production unit 8, for example, the temperature of an area of the tube furnace 83 that is close to the atomizer chamber 81 and the temperature of an area around the base material 2 are set to 200° C., and the temperature of a central portion of the tube furnace 83 in the longitudinal direction is set to the aforementioned maximum temperature described above that is higher than 200° C.

The catalyst particles generated in step S12 are added together with a carrier gas to the base material 2. Specifically, the catalyst particles and the carrier gas flow into the first cells 231 of the base material 2. The carrier gas in the first cells 231 flows through the partition wall 22 to the second cells 232. The carrier gas flowing to the second cells 232 flows out of the base material 2 and is then exhausted out of the heating chamber 82. On the other hand, the catalyst particles are deposited on the inner surfaces of the first cells 231 (i.e., on the collection surface) and heated on the collection surface. Accordingly, the collection layer 3 composed of the catalyst particles is formed on the collection surface (step S13). Since the catalyst particles are deposited mainly in the pores of the collection surface, the collection layer 3 is formed mainly in these pores as described above.

The production unit 8 produces the porous composite 1 by adding the catalyst particles to the base material 2 and heating the catalyst particles for a predetermined period of time in the heating chamber 82. It is preferable that the aforementioned addition time is longer than or equal to 0.5 minutes and more preferably longer than or equal to one minute. It is also preferable that the addition time is shorter than or equal to 60 minutes and more preferably shorter than or equal to 30 minutes.

In the production unit 8, the catalyst particles may be contained in the carrier gas that flows out of the base material 2. The generation of the catalyst particles in step S12 does not necessarily have to be conducted while the raw mist is being conveyed toward the base material 2 in the heating chamber 82, and may be conducted after the raw mist has reached the base material 2.

The production of the porous composite 1 may further include performing baking processing after step S13 on the porous composite 1 taken out of the production unit 8, in order to increase the strength to fix the catalyst particles to the base material 2. The heating temperature during the baking processing is higher than the temperature of heating the raw mist in step S12 and may preferably be higher than or equal to 1000° C. The heating temperature is also preferably lower than or equal to 1200° C. It is preferable that the heating time during the baking processing is longer than or equal to 0.5 hours. It is also preferable that the heating time is shorter than or equal to two hours. However, it is noted that usually there is no particular need to perform the baking processing, because it is possible to ensure a sufficient strength to fix the catalyst particles to the base material 2 through steps S11 to S13 described above.

Next, Examples 1 to 10 of the porous composite 1 according to the present invention and porous composites according to Comparative Examples 1 to 3 that are compared with the porous composite 1 will be described with reference to Tables 1 to 3.

TABLE 1

Condition for Production of Collection Layer

| | Solution Concentration mol/L | Heating Temperature °C | Addition Time | Baking Temperature °C | Baking Time |
|---|---|---|---|---|---|
| Example 1 | 0.5 | 400 | 5 min | — | — |
| Example 2 | 0.5 | 600 | 5 min | — | — |
| Example 3 | 0.5 | 800 | 5 min | — | — |
| Example 4 | 0.06 | 600 | 10 min | — | — |
| Example 5 | 0.06 | 800 | 10 min | — | — |
| Example 6 | 0.06 | 600 | 5 min | 1000 | 2 h |
| Example 7 | 0.5 | 600 | 5 min | — | — |
| Example 8 | 0.5 | 800 | 5 min | — | — |
| Example 9 | 0.06 | 600 | 10 min | — | — |
| Example 10 | 0.06 | 800 | 10 min | — | — |
| Comparative Example 1 | — | 1200 | — | 1200 | 2 h |
| Comparative Example 2 | — | 1200 | — | 1200 | 2 h |
| Comparative Example 3 | 0.5 | 600 | 2 h | — | — |

TABLE 2

| | Covered Region | | | Catalyst Particles | | |
|---|---|---|---|---|---|---|
| | Covered Ratio % | Outside-Pore Covered Ratio % | Porosity of Collection Layer % | Material | Median Diameter μm | Specific Surface Area m²/g |
| Example 1 | 18 | ≤Detection Limit | 55 | La—Mn—Ce—O | 0.76 | 58.1 |
| Example 2 | 20 | ≤Detection Limit | 45 | La—Mn—Ce—O | 0.71 | 71.7 |
| Example 3 | 20 | ≤Detection Limit | 45 | La—Mn—Ce—O | 0.68 | 30.0 |
| Example 4 | 30 | ≤Detection Limit | 40 | La—Mn—Ce—O | 0.61 | 7.6 |
| Example 5 | 28 | ≤Detection Limit | 42 | La—Mn—Ce—O | 0.65 | 4.0 |
| Example 6 | 20 | ≤Detection Limit | 48 | La—Mn—Ce—O | 1.0 | 2.0 |
| Example 7 | 55 | 25 | 30 | CeO$_2$ | 0.7 | 51.0 |
| Example 8 | 57 | 27 | 27 | CeO$_2$ | 0.7 | 27.7 |
| Example 9 | 35 | 5 | 35 | CeO$_2$ | 0.5 | 6.7 |
| Example 10 | 32 | 2 | 38 | CeO$_2$ | 0.6 | 6.2 |
| Comparative Example 1 | 98 | 68 | ≤Detection Limit | La—Mn—Ce—O | 3.5 | 20.0 |
| Comparative Example 2 | 98 | 68 | ≤Detection Limit | SiC | 4.0 | 2.0 |
| Comparative Example 3 | 90 | 60 | ≤Detection Limit | La—Mn—Ce—O | 0.8 | 65.0 |

TABLE 3

Performance Evaluation

| | Initial Pressure Loss | Collection Efficiency | Oxidation Starting Temperature °C | Evaluation | Comprehensive Evaluation |
|---|---|---|---|---|---|
| Example 1 | ⊚ | ○ | 280 | ⊚ | A |
| Example 2 | ⊚ | ○ | 300 | ⊚ | A |
| Example 3 | ⊚ | ○ | 320 | ⊚ | A |
| Example 4 | ⊚ | ○ | 310 | ⊚ | A |
| Example 5 | ⊚ | ○ | 380 | ○ | B |
| Example 6 | ○ | ○ | 400 | Δ | C |
| Example 7 | ○ | ○ | 360 | ○ | B |
| Example 8 | ○ | ○ | 370 | ○ | B |
| Example 9 | ○ | ○ | 380 | ○ | B |
| Example 10 | ○ | ○ | 380 | ○ | B |
| Comparative Example 1 | X | ○ | 300 | ⊚ | F |
| Comparative Example 2 | X | ○ | 450 | X | F |
| Comparative Example 3 | X | ○ | 350 | ⊚ | F |

In Examples 1 to 10, the base material 2 was made of cordierite and had a honeycomb structure. The base material 2 had an open porosity of 55%, a surface open area ratio of 30%, and a mean pore size of 18 μm. The open porosity was measured by the Archimedes method using deionized water as a medium. The surface open area ratio was obtained by analyzing an SEM image of the surface of the base material 2 (under 250× magnification), using the aforementioned image analysis software. The mean pore size was measured with a mercury porosimeter. The same applies to Comparative Examples 1 to 3.

According to Examples 1 to 10, the porous composite 1 was produced through steps S11 to S13 (by the spray pyrolysis method) in the production unit 8 described above. The atomizer chamber 81 was set to have an internal pressure of −0.01 MPa. The flow rate of a carrier gas supplied to the atomizer chamber 81 was set to 3 liters (L) per minute.

In Examples 1 to 10, different values were employed for the concentration of the starting material solution used in step S11, the temperature of heating the raw mist (maximum temperature) in step S12, and the time of adding the catalyst particles to the base material 2 in step S13. The concentration of the starting material solution was the concentration (mol per liter (mol/L)) of rare-earth elements or transition-metal elements serving as the raw material for the catalyst particles in the starting material solution and was set to 0.5 mol/L or 0.06 mol/L in Examples 1 to 10. In Examples 1 to 10, the temperature of heating the raw mist was in the range of 400° C. to 800° C. (i.e., less than 1000° C.). In Examples 1 to 10, the time of adding the catalyst particles was either 5 minutes or 10 minutes. In Example 6, the baking processing described above was performed after step S13. Table 1 shows the baking temperature (1000° C.) and the baking time (2 h) during the baking processing. In Examples 1 to 5 and 7 to 10, the baking processing was not performed after step S13.

The catalyst particles of the collection layer 3 generated in steps S11 to S13 were made of La—Mn—Ce—O in Examples 1 to 6, and made of CeO$_2$ in Examples 7 to 10. In Examples 1 to 5 and 7 to 10, the catalyst particles had a median diameter of 0.52 μm to 0.76 μm (i.e., less than 1.0 μm) and a specific surface area of 4.0 m²/g to 71.7 m²/g. In Example 6, the baking processing increased the particle sizes of the catalyst particles, so that the catalyst particles had a median diameter of 1.0 µm and a specific surface area of 2.0 m²/g. Although not shown in Table 2, in Examples 1 to 10, the maximum particle size of the catalyst particles was less than or equal to 10 µm. The median diameter and the maximum particle size of the catalyst particles were acquired by extracting only the catalyst particles from the porous composite 1 and measuring the catalyst particles by laser diffractometry. The specific surface area of the catalyst particles was acquired by measuring the catalyst particles extracted from the porous composite 1 by the BET specific surface area method.

Figure 5:
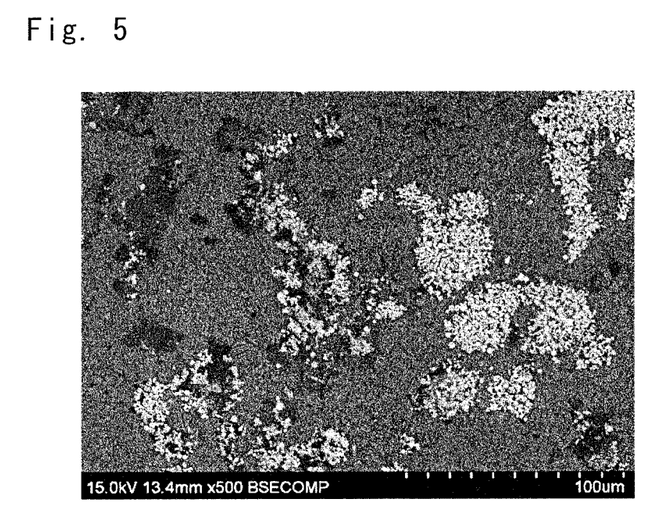
FIG. 5 shows an SEM image of a porous composite according to Example 2.

In Examples 1 to 6, the covered ratio (i.e., the rate of the total area of the covered region to the total area of the collection surface) was in the range of 18% to 30% and less than or equal to the surface open area ratio (30%) of the base material 2. In Example 7 to 10, the covered ratio was in the range of 32% to 57% and higher than the surface open area ratio of the base material 2. The covered ratio was obtained by analyzing an SEM image of the surface of the porous composite 1 (under 250× magnification), using the aforementioned image analysis software. FIG. 5 shows the SEM image of the surface of the porous composite 1 (under 250× magnification) in Example 2. In the SEM image, whitish portions correspond to the catalyst particles, and portions darker than the catalyst particles correspond to the surface of the base material 2 (the same applies to FIGS. 6 and 7).

In the production of the porous composite 1 in steps S11 to S13, the catalyst particles are preferentially deposited in pores (i.e., in openings of open pores) of the collection surface. Thus, in the case where the covered ratio is less than or equal to the surface open area ratio of the base material 2, almost all catalyst particles are deposited in the pores of the collection surface, and substantially no catalyst particles are deposited on the outside-pore region of the collection surface. Therefore, in Examples 1 to 6, the outside-pore covered ratio was less than or equal to a detection limit (i.e., substantially 0%). In Examples 7 to 10, the outside-pore covered ratio was obtained by subtracting the surface open area ratio of the base material 2 from the covered ratio. In Examples 7 to 10, the outside-pore covered ratio was in the range of 2% to 27% (i.e., lower than or equal to 30%).

Figure 6:
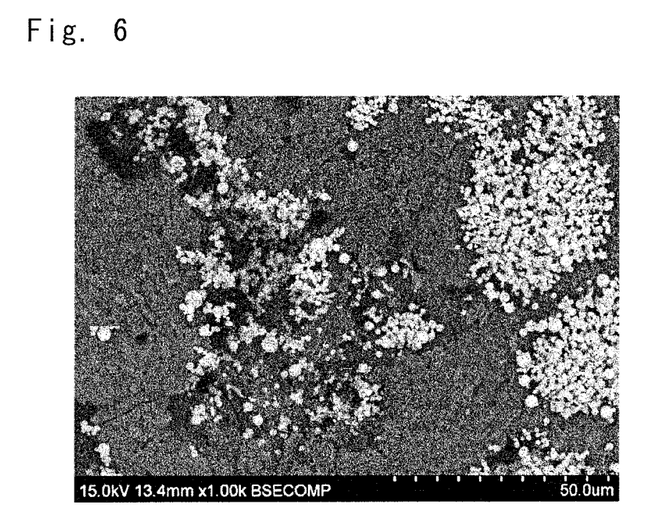

In Examples 1 to 10, the porosity of the collection layer 3 in the pores of the collection surface was in the range of 27% to 55% (i.e., higher than or equal to 20% and lower than or equal to 80%). This porosity was obtained by analyzing an SEM image of the surface of the porous composite 1 (under 1000× magnification), using the aforementioned image analysis software. FIG. 6 shows the SEM image of the porous composite 1 (under 1000× magnification) in Example 2.

On the other hand, in Comparative Examples 1 and 2, the collection layer 3 was formed by adding catalyst particles prepared in advance to the inner surfaces of the first cells 231 of the base material 2 and performing baking processing so as to fix the catalyst particles to the inner surfaces. Table 1 shows the baking temperature (1200° C.) and the baking time (2 h) during the baking processing. In Comparative Examples 1 and 2, the catalyst particles were generated by the citric acid method. Specifically, a mixed aqueous solution was prepared by dissolving a nitrate of rare-earth elements or transition-metal elements serving as the raw material for catalyst particles in ion-exchanged water together with a citric acid. Then, the mixed aqueous solution was heated to generate precursor powder, and the precursor powder was fired into catalyst particles. The catalyst particles were added to the base material 2 by mixing the catalyst particles with a liquid such as water to generate slurry and supplying the slurry into the first cells 231. The liquid such as water flowed from the second cells 232 through the partition wall 22 to the outside of the base material 2, whereas the catalyst particles adhered to the inner surfaces of the first cells 231 without passing through the partition wall 22.

In Comparative Example 3, as in Examples 1 to 10, the porous composite was formed by the spray pyrolysis method. In Comparative Example 3, the concentration of the starting material solution was 0.5 mol/L, and the temperature of heating the raw mist was 600° C. In Comparative Example 3, the time of adding the catalyst particles was two hours and longer than the time of adding the catalyst particles in Examples 1 to 10 (5 or 10 minutes).

The catalyst particles were made of La—Mn—Ce—O in Comparative Examples 1 and 3 and made of SiC in Comparative Example 2. In Comparative Examples 1 and 2, the median diameter of the catalyst particles was in the range of 3.5 µm to 4 µm and large. In Comparative Examples 1 and 2, the specific surface area of the catalyst particles was in the range of 2.0 m²/g to 20.0 m²/g. In Comparative Example 3, the catalyst particles had a median diameter of 0.8 µm and a specific surface area of 65.0 m²/g.

Figure 7:
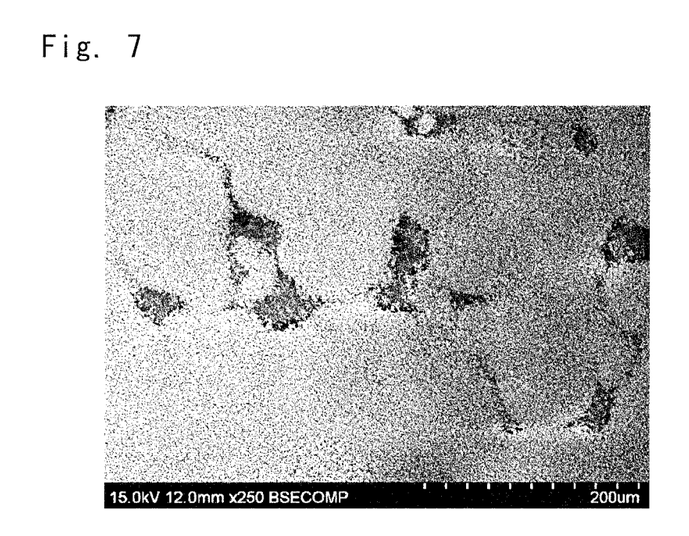
FIG. 7 shows an SEM image of a porous composite according to Comparative Example 3.

In Comparative Examples 1 to 3, the covered ratio was in the range of 90% to 98% and high. Moreover, in Comparative Examples 1 to 3, the outside-pore covered ratio was in the range of 60% to 68% and high. FIG. 7 shows the SEM image of the surface of the porous composite (under 250× magnification) in Comparative Example 3. In Comparative Examples 1 to 3, the porosity of the collection layer 3 in the pores of the collection surface was less than or equal to a detection limit (i.e., substantially 0%). In Comparative Examples 1 to 3, the median diameter and the specific surface area of the catalyst particles, the covered ratio, the outside-pore covered ratio, and the porosity of the collection layer 3 in the pores of the collection surface described above were measured by the same methods as those employed in Examples 1 to 10.

In performance evaluation of the porous composites 1 according to Examples 1 to 10, the initial pressure loss (i.e., pressure loss before the correction of particulate matter or the like), the collection efficiency, and the oxidation starting temperature of soot were used for comparison to comprehensively evaluate performance. The same applies to performance evaluation of Comparative Examples 1 to 3.

In the evaluation of the initial pressure loss in the porous composite 1, first, air at ambient temperature was supplied to the porous composite 1 at a flow rate of 10 Nm³/min to measure a difference in pressure in the porous composite 1 between the front and rear sides (i.e., a pressure difference between the air inlet side and the air outlet side). Then, assuming that this pressure difference with the base material 2 alone was a reference pressure difference, the rate of increase in the aforementioned difference in pressure in the porous composite 1 relative to the reference pressure difference was calculated as the rate of increase in initial pressure loss. This rate of increase (%) in initial pressure loss was obtained from $(A-B)/B \times 100$, where A is the aforementioned difference in pressure in the porous composite 1, and B is the reference pressure difference for the base material 2. In the evaluation of the initial pressure loss, cases where the rate of increase in initial pressure loss was lower than or equal to 20% were evaluated as excellent (marked with a double circle). Cases where the rate of increase in initial pressure loss was higher than 20% and lower than 30% were evaluated as good (marked with a single circle), and cases where the rate of increase in initial pressure loss was higher than or equal to 30% were evaluated as bad (marked with a cross).

The collection efficiency of the porous composite 1 was obtained as follows. First, the porous composite 1 serving as a GPF was mounted on an exhaust system of a passenger vehicle that includes a direct-injection gasoline engine with 2-L displacement, and a vehicle test was conducted using a chassis dynamometer. In this vehicle test, the number of particulates emitted in the exhaust gas for the case where the vehicle is driven in a driving mode regulated in Europe (RTS95) was measured by a measuring method compliant with a particulate measuring protocol (PMP) regulated in Europe. A similar vehicle test was also conducted on the aforementioned exhaust system with no GPF mounted thereon, and the number of particulates emitted in the exhaust gas was measured by the same measuring method. Assuming that the number of emitted particulates with no GPF was a "reference emission number," a value (%) obtained by dividing a difference between the reference emission number and the number of emitted particulates measured for the case with the porous composite 1 by the reference emission number was calculated as "collection efficiency (%)." In the evaluation of the collection efficiency, cases where the collection efficiency was higher than or equal to 90% were evaluated as good (marked with a single circle), and cases where the collection efficiency was lower than 90% were evaluated as bad (marked with a cross).

The oxidation starting temperature of soot in the porous composite 1 was obtained as follows. First, a test specimen with 1-inch diameter and 1-inch length was cut out from the porous composite 1, and soot was deposited with 1 g/L soot on the test specimen by a soot generator to obtain a measurement sample. In the measurement sample, soot and catalyst particles of the test specimen were in a loose contact (LC) state that is close to the state of contact between the collection layer 3 and particulate matter collected in the collection layer 3. Then, the aforementioned measurement sample was heated in accordance with a predetermined temperature rise program (e.g., at a temperature rise rate of 20° C./min) in an atmosphere in which a mixed gas containing 80% nitrogen ($N_2$) and 20% oxygen ($O_2$) flowed at SV45000 (l/hr). Then, a CO gas and a $CO_2$ gas that were generated by heating from the measurement sample were detected by a Fourier transform infrared spectrophotometer (FT-IR), and the temperature at which the cumulative amount of the generated $CO_2$ gas had reached 20% of the total amount of the $O_2$ gas was calculated as the oxidation starting temperature of soot. The catalyst particles exhibited higher catalytic activity with decreasing oxidation starting temperature.

In the evaluation of the oxidation starting temperature of soot in the porous composite 1, cases where a temperature drop from the oxidation starting temperature of soot in the base material 2 alone was higher than or equal to 100° C. (i.e., lower by 100° C. or more than the oxidation starting temperature of soot in the base material 2 alone) were evaluated as excellent (marked with a double circle). Cases where the temperature drop was higher than or equal to 50° C. and lower than 100° C. were evaluated as good (marked with a single circle), and cases where the temperature drop was higher than 0° C. and lower than 50° C. were evaluated as poor (marked with a triangle). Note that cases where the temperature drop was less than or equal to 0° C. (i.e., equivalent to or higher than the oxidation starting temperature with the base material 2 alone) were evaluated as bad (marked with a cross).

In the comprehensive evaluation of Examples 1 to 10 and Comparative Examples 1 to 3, cases that got one or more excellent results (marked with a double circle) and no bad results (marked with a cross) in the three types of evaluation including the initial pressure loss, the collection efficiency, and the oxidation starting temperature were comprehensively evaluated as "A." Cases that got three good results (marked with a single circle) were evaluated as "B," and cases that got at least one poor result (marked with a triangle) but no bad results (marked with a cross) were evaluated as "C." Note that cases that got at least one bad result (marked with a cross) were evaluated as "F." In the comprehensive evaluation, "A" indicates the highest evaluation result, and "B", "C", and "F" indicate lower evaluation results in the order specified In the evaluation of the initial pressure loss, Examples 1 to 10 were evaluated as either good (marked with a single circle) or excellent (marked with a double circle), whereas Comparative Examples 1 to 3 were evaluated as bad (marked with a cross). In the evaluation of the collection efficiency, Examples 1 to 10 and Comparative Examples 1 to 3 were all evaluated as good (marked with a single circle). In the evaluation of the oxidation starting temperature of soot, Examples 1 to 4 were evaluated as excellent (marked with a double circle), Examples 5 and 7 to 10 were evaluated as good (marked with a single circle), and Example 6 involving the baking processing was evaluated as poor (marked with a triangle). In the evaluation of the oxidation starting temperature of soot, Comparative Examples 1 and 3 were evaluated as excellent (marked with a double circle), and Comparative Example 2 was evaluated as bad (marked with a cross).

In the comprehensive evaluation, Examples 1 to 4 were evaluated as "A," Examples 5 and 7 to 10 were evaluated as "B," and Example 6 was evaluated as "C." Comparative Examples 1 to 3 were evaluated as "F" in the comprehensive evaluation.

As described above, the porous composite 1 includes the porous base material 2 and the porous collection layer 3 provided on the collection surface of the base material 2 (e.g., on the inner surfaces of the first cells 231). The collection layer 3 contains catalyst particles of rare-earth oxide or transition-metal oxide situated in the pores of the collection surface of the base material 2. The total area of the covered region of the above-described collection surface that is covered with the collection layer 3 is 60% or less of the total area of the collection surface. Accordingly, as shown in Examples 1 to 10, it is possible to achieve excellent efficiency of collecting particulate matter while suppressing an increase in pressure loss in the porous composite 1. The catalyst particles of the collection layer 3 accelerate oxidation of the collected particulate matter and also lower the combustion starting temperature of the particulate matter. Since the catalyst particles substantially do not contain high-priced metal such as elements of the platinum group, it is possible to reduce the production cost of the porous composite 1.

As described above, it is preferable that the catalyst particles are made of $CeO_2$, lanthanum-manganese-cerium oxide (La—Mn—Ce—O) or lanthanum-praseodymium-cerium oxide (La—Pr—Ce—O). The collection layer 3 containing the catalyst particles is in particular suitable for use in accelerating the oxidation of particulate matter.

As described above, it is preferable that the catalyst particles have a maximum particle size less than or equal to 10 µm and a median diameter less than 1.0 µm. The comparison between Examples 1 to 5 and Example 6 shows that it is possible to more favorably suppress pressure loss in the porous composite 1 by reducing the particle sizes of the catalyst particles as in Examples 1 to 5, and it is also possible to achieve higher catalytic activity (i.e., lower oxidation starting temperature) by increasing the area of contact between the catalyst particles and the particulate matter.

As described above, it is preferable that the total area of the covered region situated in the region other than the pores of the collection surface (i.e., in the outside-pore region) is 30% or less of the total area of the collection surface. By in this way arranging a large number of catalyst particles in the pores of the collection surface where particulate matter is more likely to be deposited, it is possible to increase the area of contact between the catalyst particles and achieve higher catalytic activity. Moreover, by reducing the possibility that the collection layer 3 is provided on the outside-pore region of the collection surface on which the particulate matter is less likely to be deposited than in the pores, it is possible to favorably suppress an increase in pressure loss in the porous composite 1 while maintaining high catalytic activity.

As described above, it is preferable that the porosity of the collection layer 3 in the pores of the collection surface of the base material 2 is higher than or equal to 20% and lower than or equal to 80%. The collection layer 3 with a porosity higher than or equal to 20% favorably suppresses an increase in pressure loss in the porous composite 1. Moreover, the collection layer 3 with a porosity lower than or equal to 80% achieves more excellent efficiency of collecting particulate matter and achieves higher catalytic activity by increasing the area of contact between the catalyst particles and the particulate matter.

As described above, it is preferable that the base material 2 has a honeycomb structure whose interior is partitioned into the cells 23 by the partition wall 22, and at least some of the cells 23 (e.g., first cells 231) have inner surfaces serving as the above-described collection surface. This allows the porous composite 1 to favorably achieve both a reduction in pressure loss and an improvement in the efficiency of collecting particulate matter.

As described above, the porous composite 1 achieves excellent efficiency of collecting particulate matter while suppressing an increase in pressure loss and further lowers the combustion starting temperature of particulate matter. Accordingly, the porous composite 1 is in particular suitable for use as a GPF that collects particulate matter in an exhaust gas emitted from a gasoline engine.

The above-described method of producing the porous composite 1 includes the step of atomizing a raw material containing rare-earth elements or transition-metal elements into raw mist (step S11), the step of generating catalyst particles of rare-earth oxide or transition-metal oxide by heating the raw mist (step S12), and the step of forming the porous collection layer 3 by adding the catalyst particles together with a carrier gas to the porous base material 2 so as to deposit the catalyst particles in the pores of the collection surface of the base material 2 (e.g., the inner surfaces of the first cells 231) (step S13). The temperature of heating the raw mist in step S12 is lower than 1000° C., and the total area of the covered region of the above-described collection surface that is covered with the collection layer 3 after step S13 is 60% or less of the total area of the collection surface. Accordingly, as described above, it is possible to provide the porous composite 1 that achieves excellent efficiency of collecting particulate matter while suppressing an increase in pressure loss and that also lowers the combustion starting temperature of particulate matter.

As described above, it is preferable that the time of adding the catalyst particles to the base material 2 in step S13 is longer than or equal to 0.5 minutes and shorter than or equal to 60 minutes. This enables favorably depositing the catalyst particles in the pores of the collection surface and suppressing deposition of the catalyst particles on the outside-pore region of the collection surface. As a result, it is possible, as described above, to favorably suppress an increase in pressure loss in the porous composite 1 while maintaining high catalytic activity.

As described above, it is preferable that the method of producing the porous composite 1 does not include the step of increasing the strength to fix the catalyst particles to the base material 2 by heating the base material 2 after step S13. This enables suppressing an increase in the particle size of the catalyst particles in the collection layer 3. As a result, it is possible, as described above, to more favorably suppress an increase in pressure loss in the porous composite 1 and to achieve higher catalytic activity (i.e., a lower oxidation starting temperature). It is also possible to shorten the time required for the production of the porous composite 1 and to improve the efficiency of producing the porous composite 1.

The porous composite 1 and the method of producing the porous composite 1 described above may be modified in various ways.

For example, in the porous composite 1, the porosity of the collection layer 3 in the pores of the collection surface of the base material 2 may be lower than 20%, or may be higher than 80%.

The outside-pore covered ratio of the porous composite 1 (i.e., the rate of the total area of the covered region situated in the outside-pore region to the total area of the collection surface) may be higher than 30%.

The maximum particle size of the catalyst particles in the collection layer 3 may be greater than 10 μm. The median diameter of the catalyst particles in the collection layer 3 may be greater than or equal to 1 μm as in Example 6.

The catalyst particles contained in the collection layer 3 are not limited to particles of $CeO_2$, La—Mn—Ce—O, and La—Pr—Ce—O as described above, and may be modified in various ways. For example, the catalyst particles may be made of $Fe_2O_3$ or $MnO_2$. Note that the collection layer 3 may be formed of mullite or alumina.

The porous composite 1 is not limited to the GPF described above and may, for example, be a diesel particulate filter (DPF) that collects particulate matter in an exhaust gas emitted from a diesel engine. Since the porous composite 1 achieves excellent collection efficiency while suppressing an increase in pressure loss and further lowers the oxidation starting temperature as described above, the porous composite 1 is in particular suitable for use not only as a GPF but also as a DPF. Note that the porous composite 1 may be used as any of various filters other than a GPF and a DPF. Alternatively, the porous composite 1 may be used in applications other than being used as a filter.

The structure of the porous composite 1 may be modified in various ways. For example, the mesh sealing parts 24 may be omitted from the base material 2. The collection layer 3 may be provided on the inner surfaces of all cells 23. Moreover, the base material 2 does not necessarily have to have a honeycomb structure and may be of any other shape such as a simple tubular shape or flat plate shape whose interior is not partitioned by a partition wall.

In the production of the porous composite 1, the temperature of heating the raw mist in step S12 may be higher than or equal to 1000° C. The time of adding the catalyst particles to the base material 2 in step S13 may be shorter than 0.5 minutes, or may be longer than 60 minutes.

The method of producing the porous composite 1 is not limited to steps S11 to S13 described above, and may be modified in various ways.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL APPLICABILITY

The present invention is applicable as a filter that collects particulate matter such as a gasoline particulate filter that collects particulate matter in an exhaust gas emitted from a gasoline engine.

REFERENCE SIGNS LIST

1 Porous composite
2 Base material
3 Collection layer
22 Partition wall
23 Cell
231 First cell
232 Second cell

The invention claimed is:

1. A porous composite comprising:
    a porous base material; and
    a porous collection layer provided on a collection surface of said base material,
    wherein said collection layer contains catalyst particles of rare-earth oxide and/or transition metal oxide situated in pores of said collection surface of said base material, and
    said collection surface has a covered region that is covered with said collection layer and whose total area is 60% or less of a total area of said collection surface.
2. The porous composite according to claim 1, wherein said catalyst particles are made of $CeO_2$, lanthanum-manganese-cerium oxide, or lanthanum-praseodymium-cerium oxide.
3. The porous composite according to claim 1, wherein said catalyst particles have a maximum particle size less than or equal to 10 μm, and
    said catalyst particles have a median diameter less than 1.0 μm.
4. The porous composite according to claim 1, wherein a total area of said covered region situated in a region other than the pores of said collection surface is 30% or less of the total area of said collection surface.
5. The porous composite according to claim 1, wherein said collection layer in the pores of said collection surface of said base material has a porosity higher than or equal to 20% and lower than or equal to 80%.
6. The porous composite according to claim 1, wherein said base material has a honeycomb structure whose interior is partitioned into a plurality of cells by a partition wall, and
    at least some of said plurality of cells have inner surfaces serving as said collection surface.
7. The porous composite according to claim 6, wherein the porous composite is a gasoline particulate filter that collects particulate matter in an exhaust gas emitted from a gasoline engine.
8. The porous composite according to claim 6, wherein said plurality of cells include:
    a first cell that is open at an end of a first side in a longitudinal direction and is sealed at an end of a second side in the longitudinal direction; and
    a second cell that is sealed at an end of said first side in the longitudinal direction and is open at an end of said second side in the longitudinal direction, and
    said first cell has an inner surface that serves as said collection surface on which said collection layer is provided, and
    said second cell has an inner surface on which said collection layer is not provided.
9. A method of producing a porous composite according to claim 1, comprising:
    a) atomizing a raw material containing a rare-earth element and/or a transition metal element into raw mist;
    b) generating catalyst particles of rare-earth oxide and/or transition metal oxide by heating said raw mist; and
    c) forming a porous collection layer by adding said catalyst particles together with a carrier gas to a porous base material so as to deposit said catalyst particles in pores of a collection surface of said base material,
    wherein in said operation b), a temperature of heating said raw mist is lower than 1000° C., and
    said collection surface after said operation c) has a covered region that is covered with said collection layer and whose total area is 60% or less of a total area of said collection surface.
10. The method of producing a porous composite according to claim 9, wherein
    in said operation c), said catalyst particles are added to said base material for a period of time longer than or equal to 0.5 minutes and shorter than or equal to 60 minutes.

* * * * *